April 9, 1957  J. W. MONTGOMERY, SR  2,788,165
FISH STRINGER
Filed May 2, 1956

INVENTOR
JAMES W. MONTGOMERY, SR.
BY Gustave Miller
ATTORNEY

United States Patent Office 2,788,165
Patented Apr. 9, 1957

2,788,165

FISH STRINGER

James W. Montgomery, Sr., Duluth, Minn.

Application May 2, 1956, Serial No. 582,230

4 Claims. (Cl. 224—7)

This invention relates to a fishing device, and it particularly relates to a device upon which fish may be strung after they have been caught.

The present invention provides an improvement over the inventor's prior Patent No. 2,563,480, granted August 7, 1951, and has for one of its primary objects to obtain a fish stringer which accomplishes all the functions of this prior patent but by means of a far less complex and expensive construction.

Another object of the present invention is to provide a fish stringer which is very easily manipulated.

Another object of the present invention is to provide a fish stringer which consists of very few parts and which is not readily damaged.

Other objects of the present invention are to provide an improved fish stringer, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which.

Figure 2:
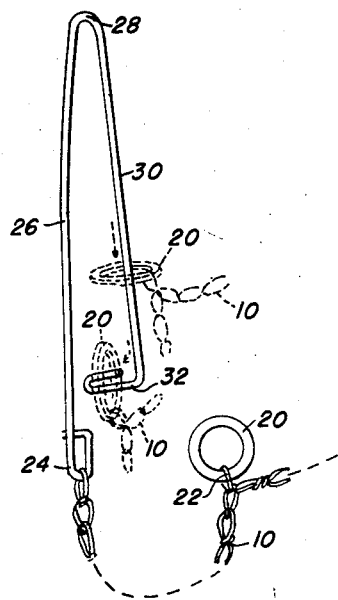
Fig. 2 is a perspective view of a portion of the device shown in Fig. 1, the device being shown in open position.

Referring now in greater detail to the drawing wherein similar reference characters refer to similar parts, there is shown a chain 10, preferably constructed of galvanized iron or brass, having a bar 12 connected at one end thereof. This bar 12 is twisted around to form a center loop 14 which passes through the end link of the chain to form the connection between the bar and the chain.

Figure 1:
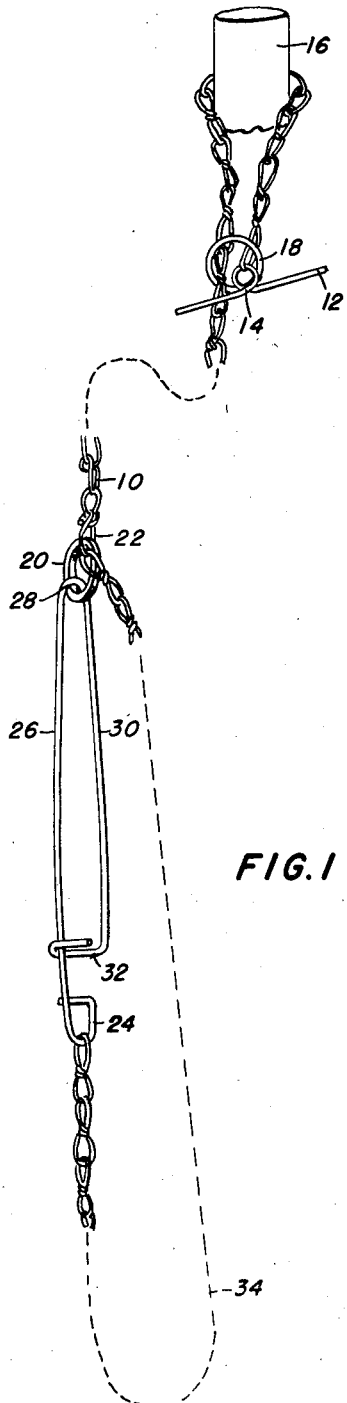
Fig. 1 is a fragmentary, perspective view of a device embodying the present invention, the device being shown in closed position and attached to a support.

The end portion of the chain adjacent the bar 12 is adapted to be looped around a support which is here illustrated as a post 16 on a boat, not shown. However, this support may assume various other forms such as a tree on shore adjacent a body of water or even the belt of the fisherman himself. After being looped around the support, the bar 12 is threaded longitudinally through a ring 18 slidably positioned on the chain, after which the bar is turned transversely of the ring to lock the chain in place around the support, as illustrated in Fig. 1.

Intermediate the ends of the chain 10 there is positioned a ring 20 which passes through one of the links 22 of the chain. The opposite end of the chain is connected to an eyelet 24 at one end of a locking pin 26.

The locking pin 26 is of spring-like material and is bent over at 28 to form a locking arm 30 having a lateral open hook 32 at its free end. This hook is adapted to releasably engage the other portion of the pin and to be held in engagement by the spring-like qualities of the pin which tends to pull the two arms of the hook away from each other.

In operation, the chain is fastened to the support, in the manner illustrated, and when a fish is caught, it is strung on the chain by passing the closed pin 26 therethrough, and then permitting it to depend from the loop portion 34 of the chain. The pin 26 is then opened and the ring 20 is passed over the hook 32 and onto the arm 30 of the pin 26. The hook 32 is then again engaged with the main portion of the pin to lock the chain in place. Each time a fish is caught, the hook 32 is disengaged by a quick motion, the ring 20 is removed, the pin is passed through the fish, the ring 20 is replaced on the pin, and the hook is again engaged.

When used for trout fishing and the like, the stringer described above is fastened to the fisherman's belt or to some other convenient part of his person and the loop portion 34, containing the strung fish, is permitted to drop into the water. When leaving the stream, the stringer and the fish are merely dropped into the basket carried by the fisherman. This can be repeated from stream to stream.

Utilizing ring 20 in cooperation with the locking pin at 28 provides a fish hold chain loop of fixed or predetermined size, but if a larger or smaller loop is desired, the ring 20 may be ignored, and the locking pin may be secured at 28 about a portion of the chain on either side of ring 20, thus providing a larger or a smaller fish holding loop as desired.

Furthermore, the chain may be of any desired gauge, depending on the weight and size of fish that are being caught.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fish stringer comprising a chain, a pin connected to one end of said chain, and means for attaching said chain to a support at the opposite end of said chain, said pin having a locking portion and said chain having an engagement means intermediate its ends, said engagement means being adapted to be releasably engaged by said locking portion, said chain being so constructed that it forms a loose loop when said engagement means is engaged by said locking portion, said pin being a bent resilient, thin, elongated member having a portion bent back on itself, said portion forming said locking portion, said locking portion being provided with a lateral hook at its free end to releasably engage the opposite portion of the pin.

2. The fish stringer of claim 1 wherein said engagement means is a ring loosely connected to the intermediate portion of the chain.

3. A fish stringer comprising a chain, a bar twisted to form a central loop attached to one end of said chain by interengagement of said loop and the end link of said chain, a bent, resilient lock pin, having releasable locking means for closing said pin upon itself, connected to the opposite end of said chain, and a ring slidable on said chain to releasably engage said bar and a second ring connected to the intermediate portion of said chain and releasably engageable with said lock pin.

4. The fish stringer of claim 3 wherein said chain is constructed to form a flexible loop when a portion thereof is engaged with said lock pin.

References Cited in the file of this patent

UNITED STATES PATENTS

| 1,500,613 | Halloway | July 8, 1924 |
| 2,226,402 | Hirschmann | Dec. 24, 1940 |
| 2,731,180 | Fricker et al. | Jan. 17, 1956 |